United States Patent [19]

Sakaki

[11] 4,056,141
[45] Nov. 1, 1977

[54] SEAL ASSEMBLY IN ROTARY REGENERATIVE HEAT EXCHANGER

[75] Inventor: Yoshihiro Sakaki, Suwa, Japan

[73] Assignee: Nissan Motor Company, Limited, Yokohama, Japan

[21] Appl. No.: 663,231

[22] Filed: Mar. 3, 1976

[30] Foreign Application Priority Data

Mar. 25, 1975 Japan ............................ 50-34943

[51] Int. Cl.² ........................................ F28D 21/00
[52] U.S. Cl. .................................. 165/9; 277/96.1
[58] Field of Search ............... 277/27, 96, 96.1, 95; 165/9

[56] References Cited

U.S. PATENT DOCUMENTS

| | | | |
|---|---|---|---|
| 3,791,138 | 2/1974 | Stockton | 165/9 X |
| 3,856,077 | 12/1974 | Siegla | 165/9 |
| 3,913,926 | 10/1975 | Rao | 165/9 X |
| 3,954,135 | 5/1976 | Hewlitt | 165/9 |

*Primary Examiner*—Ronald H. Lazarus
*Assistant Examiner*—Theophil W. Streule, Jr.

[57] ABSTRACT

A seal assembly comprising a seal member which is placed on an end face of a cylindrical and rotatable heat-transferring member by the support of connecting pins secured to a housing member of the heat exchanger, a support plate fixedly placed on a surface of the housing member opposite to and spaced from the end face of the heat-transferring member, and a resilient shield plate which is not joined with the seal member but is fixed at one end to the support plate to extend obliquely such that an acute angle is formed between the support plate and one side of the shield plate to be exposed to a fluid of a higher pressure, until its free end comes into contact with the seal member.

7 Claims, 3 Drawing Figures

SEAL ASSEMBLY IN ROTARY REGENERATIVE HEAT EXCHANGER

This invention relates to a rotary regenerative heat exchanger, and more particularly to a seal assembly for providing a seal between the rotary heat-transferring member of the heat exchanger and a stationary wall member.

A rotary regenerative heat exchanger for use, e.g., in a gas turbine engine has a cylindrical and rotatable member which is made of a heat-absorbing and heat-transferring material such as a metal sheet in spaced layers and moves alternately through two different fluid streams. The rotatable heat-transferring member is provided with seal assemblies on its both end faces to provide seals between the rotating heat-transferring member and a stationary wall member so that leakage of one of the two fluids into the other may not occur along the end faces of the rotating member. A typical conventional seal assembly for this purpose is fundamentally made up of a seal member which is placed on the end face of the heat-transferring member and a shield plate of a resilient material which is fixed at one end to the seal member and extends obliquely towards the wall member such that the free end of the shield plate comes into contact with the wall member. When the front and back sides of the shield plate are respectively exposed to two different fluid pressures, the fixed and free ends of the plate are respectively pressed against the seal member and the wall member.

A seal assembly of this type has certain disadvantages in practical applications. Firstly, entire renewal of the assembly is needed when the seal member is worn out. In addition, the seal member tends to exhibit considerable and non-uniform wear because the influence of the pressure difference between the two fluids on the seal member is locally magnified through the integrated shield plate.

It is an object of the present invention to provide an improved seal assembly in a rotary regenerative heat exchanger of the described type, which seal assembly features little possibility of non-uniform wear of its seal member and ease in renewal of the seal member.

It is another object of the invention to provide a seal assembly including a seal member and a shield plate which is provided as a separate member from the seal member but can press the seal member against a rotating heat-transferring member.

According to the invention, a seal assembly for preventing leakage of a first fluid of a relatively high pressure into a second fluid of a relatively low pressure along an end face of a cylindrical and rotatable heat-transferring member of a rotary regenerative heat exchanger comprises: (a) a seal member placed on the end face of the rotatable member and loosely joined with a surface of the stationary housing member of the heat exchanger, which surface is opposite to and spaced from the end face of the heat-transferring member; (b) a support plate placed on and fixed to the afore-mentioned surface; and (c) a shield plate of a resilient material which is fixed at one end to the support plate to extend obliquely therefrom towards the end face of the heat-transferring member such that an acute angle is formed between the aforementioned surface and one side of the shield plate to be exposed to the first fluid, so that the extended end of the shield plate is in contact with the seal member at a surface opposite to the aforementioned surface of the housing member.

The seal assembly has preferably a back-up plate attached onto the other side of the shield plate, and the shield plate is preferably warped such that the one side thereof to be exposed to the first fluid is convex.

The invention will be fully understood from the following detailed description of a preferred embodiment with reference to the accompanying drawings, wherein.

Figure 1:
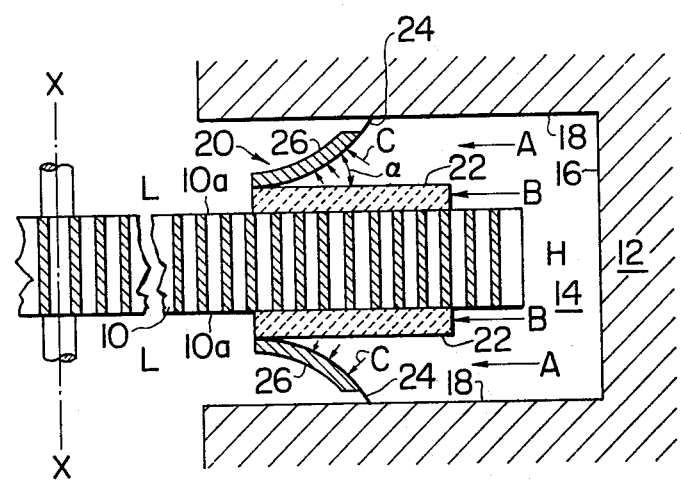
FIG. 1 is a fragmentary and longitudinal sectional view of a rotatable heat-transferring member of a rotary regenerative heat exchanger provided with conventional seal assemblies.

Referring to FIG. 1, a rotatable and heat-transferring member 10 of a conventional rotary regenerative heat exchanger (not indicated) is disposed in a housing 12 which forms therein two fluid passages (not indicated) to pass respectively a first fluid stream of a relatively high pressure represented by the symbol H and a second fluid stream of a lower pressure represented by L. The heat-transferring member 10 has a cylindrical shape and rotates on the longitudinal axis X—X. A peripheral portion of the heat-transferring member 10 is enclosed in an annular recess 14 formed in the housing 12 such that the peripheral wall 16 and the end walls 18 of this recess 14 are spaced from the heat-transferring member 10. As is known, the high pressure fluid H is admitted into the annular recess 14 to apply a balancing pressure to the rotating heat-transferring member 10 in radial directions. To prevent leakage of the high pressure fluid H into the other fluid L, a conventional seal assembly 20 is installed in each of the gaps between the end faces 10a of the heat-transferring member 10 and the opposite walls 18 of the recess 14. Each seal assembly 20 includes a seal member 22 which is joined with the walls 18 of the recess 14 by means of, e.g., connecting pins (not shown) such that the seal member 22 is placed on the end face 10a of the heat-transferring member 10 but can move vertically to the end face 10a. A shield plate 24 of a resilient material is fixed at one end to the seal member 22 and extends obliquely towards the opposite wall 18 and the pressurized fluid H to form an acute angle α between the outer surface of the seal member 22, until the free end of the shield plate 24 reaches the opposite wall 18 of the recess 14. A back-up plate 26 is attached onto the outer surface (which is to be exposed to the second fluid L) of the shield plate 24 to reinforce the shield plate 24. When the peripheral region of the recess 14 is filled with the high pressure fluid H, the shield plate 24 is pressed tightly at the free end against the wall 18 and at the fixed end against the seal member 22. Accordingly, the seal member 22 is kept in intimate contact with the end face 10a of the rotating member 10.

I have recognized that the disadvantages of the seal assembly 20 as described hereinbefore originate from the integrated construction of the seal assembly, i.e., the fixing of the shield plate 24 and the back-up plate 26 to the seal member 22.

Figure 2:
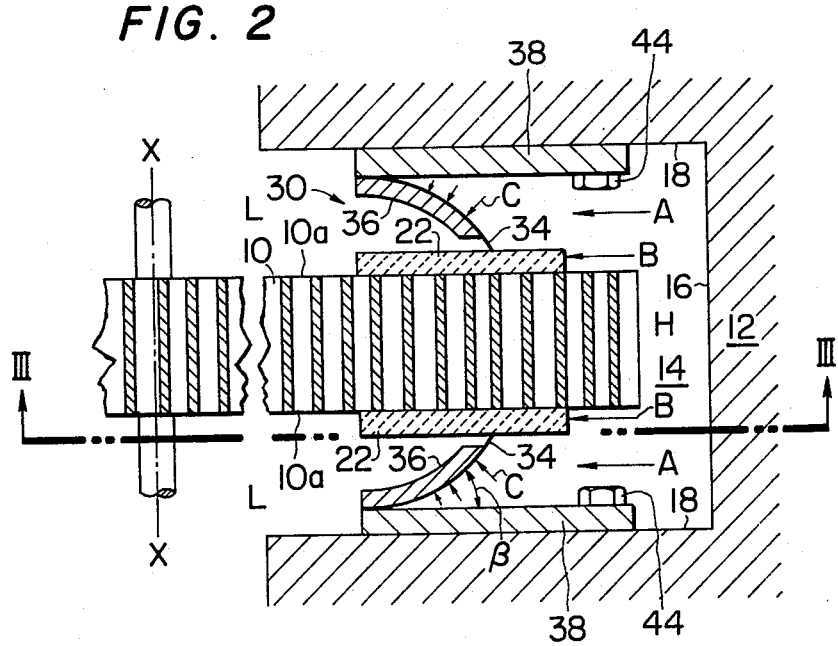
FIG. 2 is a generally similar view to FIG. 1 but shows a combination of the same heat-transferring member and improved seal assemblies according to the invention.
Figure 3:
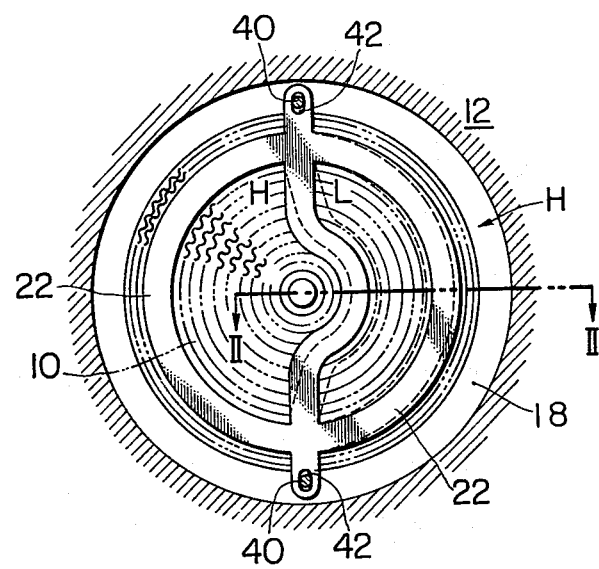
FIG. 3 is a plan view, partly in section, taken along the line 3—3 of FIG. 2.

In FIGS. 2 and 3, the heat-transferring member 10 is arranged in the same manner as in FIG. 1 relatively to the recess 14 in the housing 12 but is provided with an improved seal assembly 30 according to the invention. The seal member 22 itself in this seal assembly 30 is not different from that in the conventional seal assembly 20 of FIG. 1. As seen in FIG. 3, the seal member 22 has an annular portion and a twisted bar-shaped portion in plane figure. The bar-shaped portion intersects the annular portion at two regions and extends outwardly of the periphery of the end face 10a of the heat-transferring member 10, so that the seal member 22 may be regarded as a generally $\phi$-shaped member. The seal member 22 is joined with the walls 18 of the recess 14 by means of two connecting pins 40 which allow the seal member 22 to move vertically to the end face 10a of the heat-transferring member 10. Two perforations 42 for respectively passing the two pins 40 are formed in the seal member 22 at the extended end regions of the bar-shaped portion. In plan view, these perforations 42 are elongate in the radial direction to allow a certain deformation of the seal member 22 (as indicated by broken lines in FIG. 3) when the seal member 22 is pressed against the rotating heat-transferring member 10 and undergoes the influence of the pressure difference between the two fluids H and L as will be described hereinafter.

A shield plate 34, which is fundamentally similar to the shield plate 24 of FIG. 1, is fixed at one end to a surface of a support plate 38 which is placed on and fixed to the wall 18 by means of, e.g., bolts 44. The shield plate 34 extends obliquely towards the end face 10a and the high pressure fluid H to form an acute angle $\beta$ between the exposed surface of the support plate 38, i.e., between the wall 18. The extended end of the shield plate 34 reaches the outer surface of the seal member 22 placed on the end face 10a. The shield plate 34 is warped so that the convex surface may be exposed to the high pressure fluid H. A back-up plate 38 is attached onto the outer and concave surface of the shield plate 34 as a reinforcing member.

The shield plate 34, the back-up plate 36 and the support plate 38 are preferably made from a heat-resistant steel such as stainless steel since the seal member 22 reaches a considerably high temperature during operation. It is recommended to join the shield plate 34 with the back-up plate 36 and the support plate 38 by the use of a hard solder such as a heat resisting nickel-base hard solder. The seal member 22 is made from a conventional adequately heat-resistant material.

The seal member 22 is not joined with the shield plate 34 as an essential feature of the invention, but the movement of the seal member 22 towards the wall 18 is restricted by the shield plate 34. When the inner and outer surfaces of the shield plate 34 are exposed to the high pressure fluid H and the lower pressure fluid L, respectively, the shield plate 34 is deflected towards the fluid L so that the free end of the shield plate 34 is pressed against the outer surface of the seal member 22. As a result, the seal member 22 is pressed against and kept in intimate contact with the end face 10a of the heat-transferring member 10. Thus, any leakage of the high pressure fluid H into the low pressure fluid L along the front or back surface of the seal member 22 can be prevented. Even if the heat-transferring member 10 and/or the seal member 22 exhibit thermal expansion individually, the function of the seal assembly 30 can be maintained unchanged due to the resilient property and the compressing action of the shield plate 34.

A fluid pressure represented by the arrows A in FIGS. 1 and 2 exerts a compressive force represented by the arrows B on the outer side face of the seal member 22 and a compressive force C on the convex surface of the shield plate 34. In the conventional seal assembly 20 of FIG. 1, the compressive force C contributes to the deformation of the seal member 22 in addition to the compressive force B since the shield plate 24 is fixed to the seal member 22. Consequently, a significant deformation tends to occur in a specific region of the seal member 22 in FIG. 1 and results in considerable and non-uniform wear of the seal member 22 at some locations. In the improved seal assembly 30 of FIG. 2, the compressive force C is not appreciably transmitted to the seal member 22 from the separately arranged shield plate 34. The deformation of the seal member 22 of FIG. 2 is caused almost exclusively by the action of the compressive force B. Since the force B is produced by the action of the fluid pressure A on the side face of the seal member 22 which has a relatively small area, the seal member 22 does not deform significantly and the wear of the seal member 22 occurs almost uniformly over the entire area.

A seal assembly 30 according to the invention is primarily advantageous in that the fear of local and significant wear of the seal member 22 is precluded and that the seal member 22 alone can be renewed when it is worn to a practical limit. In addition, it is quite easy to remedy a thermal distortion of the seal member 22 when an antiwear layer is formed on the surface of the seal member 22 by spraying a molten material because the seal member 22 has no complicatedly shaped part for joining with the shield plate 34. The seal member 22 can be made from an excellent material such as ceramics which could not be used in the conventional seal assembly 20 because of difficulty in joining with the metallic shield plate 24.

What is claimed is:

1. In a rotary regenerative heat exchanger including a stationary housing member and a heat-transferring member which is cylindrical and rotatable on the longitudinal axis thereof for heat exchange between a first fluid stream of a relatively high pressure and a second fluid stream of a relatively low pressure, the housing member having a surface opposite to and spaced from a portion of an end face of the heat-transferring member, and a seal assembly for preventing leakage of the first fluid into the second fluid along said end face of the heat-transferring member, said seal assembly comprising:
   a seal member placed on said end face of the heat-transferring member and loosely joined with said surface of the housing member such that said seal member is movable vertically to said end face;
   a support plate fixedly placed on said surface; and
   a shield plate of a resilient material fixed at one end to said support plate to extend from said support plate obliquely towards said end face of the heat-transferring member such that an acute angle is formed between said surface and one side of said shield plate to be exposed to the first fluid, the extended end of said shield plate being in sliding contact with said seal member at a surface opposite to said surface of the housing member.

2. A seal assembly as claimed in claim 1, further comprising a back-up plate attached onto the other side of said shield plate to be exposed to the second fluid.

3. A seal assembly as claimed in claim 2, wherein said shield plate is warped such that said one side to be exposed to the first fluid is convex.

4. A seal assembly as claimed in claim 2, wherein said seal member consists of an annular portion and a twisted bar-shaped portion arranged to intersect said annular portion at two regions, both end regions of said bar-shaped portion extending outwardly of the periphery of said end face of the heat-transferring member.

5. A seal assembly as claimed in claim 4, wherein said seal member has two perforations formed respectively in said end regions of said bar-shaped portion, said perforations being elongate in the radial direction of said annular portion, said seal member being joined with said surface of the housing member by two pins arranged respectively to pass through said two perforations.

6. A seal assembly as claimed in claim 2, wherein said shield plate, said support plate and said back-up plate are respectively made from a heat-resisting steel.

7. A seal assembly as claimed in claim 6, wherein said shield plate is fixed to said support plate and said back-up plate with a hard solder.

* * * * *